United States Patent [19]

Roberts

[11] 4,121,005

[45] Oct. 17, 1978

[54] CONFORMABLE FOAM

[75] Inventor: Charles William Roberts, North Hudson, Wis.

[73] Assignee: Minnesota Mining and Manufacturing Company, St. Paul, Minn.

[21] Appl. No.: 877,310

[22] Filed: Feb. 13, 1978

[51] Int. Cl.[2] .......... B32B 3/10

[52] U.S. Cl. .......... 428/131; 428/155; 428/315; 428/343

[58] Field of Search .......... 428/36, 131, 132, 133, 428/134, 135, 136, 137, 155, 315, 343

[56] References Cited

U.S. PATENT DOCUMENTS

| | | | |
|---|---|---|---|
| 2,768,924 | 10/1956 | Wright | 428/310 |
| 3,043,731 | 7/1962 | Hill | 428/310 |
| 3,328,505 | 6/1967 | Spencer | 428/155 |
| 4,025,675 | 5/1977 | Jonda | 428/36 |

*Primary Examiner*—William J. Van Balen

*Attorney, Agent, or Firm*—Cruzan Alexander; Donald M. Sell; Gary L. Griswold

[57] ABSTRACT

Foam material useful in preventing decubitus ulcers, said material being a relatively thick, perforated and cut foam sheet which is conformable.

6 Claims, 5 Drawing Figures

CONFORMABLE FOAM

This invention relates to a foam material useful in the prevention and treatment of decubitus ulcers.

Decubitus ulcers, or bedsores as they are commonly called, occur when areas of skin are compressed between hard bone and an external surface for some period of time. Among persons most susceptible to decubitus ulcers are those who are immobilized. These persons generally develop ulcers over such bony protuberances of the body as the heels of the feet, the knees, the elbows, the greater trochanters on the sides and the sacrum and shoulder blades on the posterior.

The most common procedure utilized to prevent bedsores, involves turning the bedridden patient at least every two hours in order to allow re-establishment of the circulation over the body protuberances. This procedure imposes a heavy work load on hospital personnel.

Another approach toward minimization of bedsores has been to design the bed mattress itself to allieviate the pressure exerted on the bony protuberance of the body. U.S. Pat. No. 3,893.198 discloses a mattress wherein the mattress surface is subdivided into a number of load bearing units which are covered by a number of waterproof sheets. U.S. Pat. No. 3,866,252 discloses a mattress with a number of laminated sheets of resilient material which have been grooved. Not only are these mattresses expensive but they fail to perform their desired function. This failure is due to sheets and plastic covers which encase the mattresses. These coverings themselves cause pressure points due to the surface tension resulting from their being in a taut state. Also the covering has a tendency to restrict the movement of the loading bearing units in the mattress causing them to be non-functional, resulting in additional pressure on bony protuberances.

Another approach has been to utilize cup-like pads that are strapped to the body member, e.g., as disclosed in U.S. Pat. No. 3,937,218. Such devices not only fail to readily conform to body movements but cause discomfort to the patient due to irritation from the rubbing of the straps. Cup-like pads offer the further disadvantage of becoming easily displaced requiring constant repositioning in order to obtain the desired protection.

A foam material has been found which eliminates the aforesaid problems and provides a low cost, conformable, comfortable, simple and consistently functional means for preventing decubitus ulcers in immobilized patients.

Applicant's foam material is conformable to body members and comprises a relatively thick foam sheet having a top surface, and a skin contacting surface. The foam sheet contains therethrough a substantial number of perforations. The foam between a substantial number of the perforations is cut from the top surface through a portion of the thickness of the foam. As a result of the cuts, foam segments are formed which are hingedly connected to the adjacent segments adjacent the skin contacting surface of said foam sheet. The foam cut depth and spacing are such that the foam material has a stiffness as defined hereinafter of from about 0.4 gm/cm to about 2.0 gm/cm in the latitudinal dimension of the foam. Preferably the foam has a stiffness of from about 0.4 gm/cm to about 2.0 gm/cm in its longitudinal dimension as well. The foam perforations are of such a size and spacing to make the foam extensible in the longitudinal dimension and to also provide the aforesaid stiffness.

As used herein, a relatively thick foam sheet means a foam sheet of such thickness that it will provide free standing cushioning support within the foam cell structure when loaded with the weight of a body member. The thickness of the foam sheet will vary depending on the type of foam. Normally it will be from about 0.5 cm to 9.0 centimeters.

Applicant's foam material will be described in detail by the drawings in which.

Figure 1:
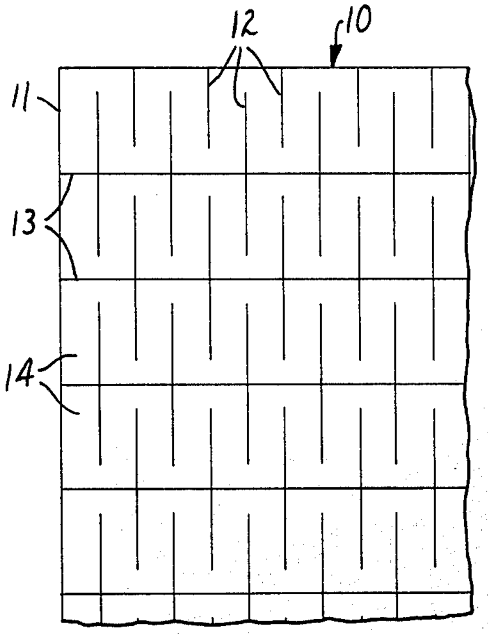
FIG. 1 is a top view of the conformable foam material of the present invention in its relaxed condition.
Figure 3:
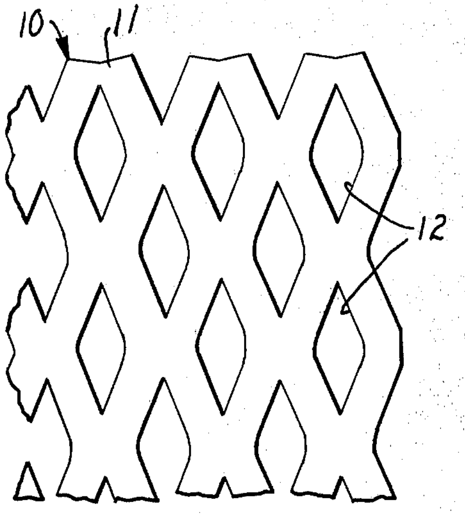
FIG. 3 illustrates the skin contacting surface of the foam material in the stretched condition.

Specifically in FIG. 1 the foam material 10 comprises a foam sheet 11 containing perforations 12 in the relaxed position. In the foam material 10 shown, the perforations 12 are slits, but it is contemplated that other types of perforations could be utilized, e.g., semi-circles, sine waves, etc. The perforations or slits 12 are in parallel rows and are offset from the perforations 12 in the next adjacent row. The rows of perforations 12 are perpendicular to the longitudinal dimension of the foam material 10 which is defined as the dimension parallel to cuts 13. These slits contribute to the ability of the foam material to expand in the longitudinal direction. As shown in FIG. 3 depicting the skin contact surface of the foam material 10, when expanded, the perforations of the foam material 10 take on various polygonal shapes.

Also with reference to FIG. 1, the foam material 10 additionally contains a series of parallel cuts 13 in the foam sheet 11 between the perforations 12. The cuts 13 are parallel to the longitudinal dimension of the foam material 10. The cuts 13 are made from the top surface of foam material 10 to a depth such that said foam material 10 exhibits the ability to conform to body members.

Figure 2:
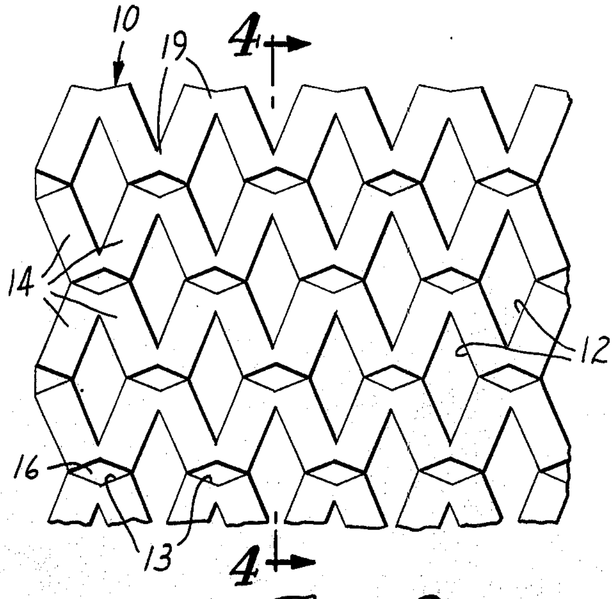
FIG. 2 illustrates the top view of the foam material of FIG. 1 in the stretched condition.
Figure 5:
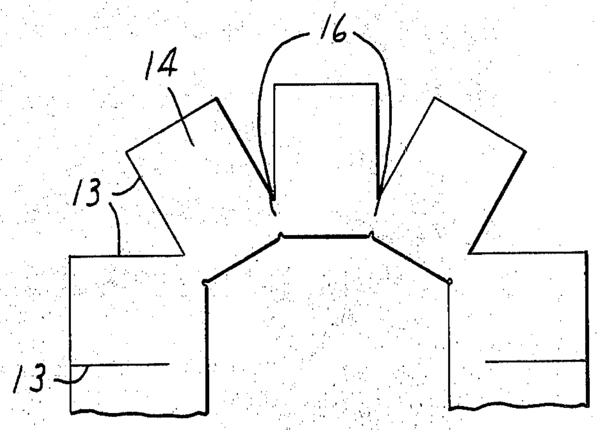
FIG. 5 illustrates an end view of the foam material of the present invention when it is bent to conform to a body member (not shown).
Figure 4:
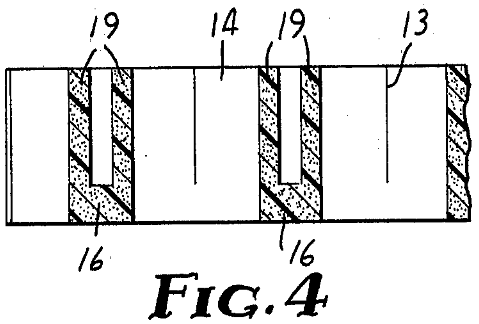
FIG. 4 is a sectional view of the foam material depicted in FIG. 2 through line 4—4.

The parallel cuts 13 result in foam segments 14 which are hingedly connected to the adjacent segments adjacent the skin contacting surface of the foam material 10. These results are best seen in FIG. 2 and FIG. 4. As shown in FIG. 2, the series of parallel cuts 13 result in a network of individual segments 14 each joining along the full length of a common vertical edge 19 with the preceeding and next consecutive segments. The connections 19 form the segments into a series of accordian-like pleats. The movement of each series of pleats is related to the next adjacent series of pleats through the hinge connection 16, as is shown in FIGS. 4 and 5.

The conformability of the foam material 10 depends on the type and thickness of foam, spacing and type of perforations and spacing and depth of cuts. Thus with different foams, different cuts and perforations are required, the depth of cut varying with the type of perforation and foam. Applicant has devised a test for conformability which quantifies this characteristic and allows one to change the variables to obtain the sought after conformability.

The conformability of the foam material of the present invention can be correlated to the stiffness of the foam material. Stiffness as used herein is determined following the test procedure set forth hereinafter. A Drape-Flex stiffness tester of the type shown in Federal Test Method Standard No. 191, FIG. 52016.1 (available from J.J. Press Co., San Diego, California) is used; however, the plate is used in the vertical position rather than horizontal. A piece of foam material is cut to be 4 inches (10 cm) by 6 inches (15 cm). The 15 cm dimension of the foam is perpendicular to the characteristic of the foam sheet which is being determined. That is, if the stiffness is being determined in relation to the cuts in the foam as opposed to the perforations, the 15 cm dimension is perpendicular to the rows of cuts. The foam is attached to a vertical plate normally by the adhesive on the skin contacting surface of the foam material so that the 15 cm dimension is perpendicular to the vertical dimension of the vertical plate. One-half of the length of the foam is attached to the plate and the other one-half extends beyond the plate. The line on the foam contacting the vertical edge of the plate becomes the crease line of the foam during the test. A dowel is attached to the non-plate contacting surface and non-plate contacting end of the foam at a point 5 cm from the crease line. The dowel runs along the 10 cm dimension of the foam. A thread is attached to the center of the dowel. The thread is passed through the foam sheet material, through a second plate which is at an angle of 41.5° from the plane of the first plate, over a pulley to make a 90° turn and attached to the pulling gauge which indicates the force in terms of grams. Force is applied to the pulling gauge sufficient to bend the foam from the plane of the first plate to the second plate. The force required to perform this task is measured in grams. The stiffness of the foam material is the force in grams divided by the width (10 cm) of the foam. It has been found that the stiffness of the foam material should be from about 0.4 grams per centimeter to about 2.0 grams per centimeter with the most preferred stiffness being about 0.8 grams per centimeter. The stiffness test can be performed with the vertical edge of the test plate parallel to the cuts in the foam or parallel to the perforations in the foam. However, in the event that the test is performed in relation to the perforations in the form, the 15 cm dimension of the foam material to be tested will be perpendicular to the rows of perforations of the foam rather than perpendicular to the rows of cuts in the foam. The foam material must exhibit the aforesaid stiffness in respect to cuts in order for the foam to have the requisite conformability. Preferably the foam exhibits the aforesaid conformatility in regard to both the cuts and perforations, i.e., in regard to both the latitudinal and longitudinal dimension of the foam.

In use the foam material 10 is placed on the body member so that the cuts 13 are parallel to the body member and the perforations are extensible in the direction of joint flexure. Thus, the perforations 12 run perpendicular to the direction of motion of the body member but allow the body member to move because of the accordian-like expansion of the perforations 12. The conformability of the foam material to the body member is provided by the hinged connection 16 of the foam segments 14 which is in turn provided by the cuts 13 and by the aforesaid accordian-like expansion of the perforations. The hinged connection allows the boney protuberances to displace, as required, the overlying foam segments while simultaneously redistributing the load of the body member throughout the foam material.

The foam material of the present invention may utilize any of the low cost materials presently known to the art, such as polyurethane, polyethylene and polypropylene with polyurethane being preferred. As noted the foam material should be relatively thick. The thickness required is determined by the weight of the body member to be supported and the density of the foam. Open cell polyurethane foam having a density of about 0.02 gm/cm$^3$ and a thickness in the range between about 1.0 to 5 cm is preferred.

The foam may either be open or closed cell. In order to minimize skin maceration, it is preferred that the foam be open cell, even though it has been found that when closed cell foam is utilized, the slits in the foam provide sufficient porosity in the foam material to pass perspiration from the human skin therethrough while at the same time allowing fresh air to be exchanged.

It is preferred that the foam material be retained in position by a pressure sensitive adhesive coating applied to the skin contact surface of the padding material. These adhesive are generally known to the art and are usually protected with a release liner. In the alternative the foam material may be retained in position by strips of adhesive tape.

The preferred manufacture of a foam material of the present invention involves using a 0.02 gm/cm$^3$ density urethane foam bun from Tenneco Chemical Co., Carlstadt, New Jersey. This foam bun is trimmed and converted into the desired thickness, e.g., 2.54 cm and then rolled into a master roll. The master roll is then unwound and laminated with heat and pressure to a previously prepared adhesive coated liner.

The previously prepared liner utilizes a preferred pressure-sensitive adhesive of a pure rubbery copolymer of isooctyl acrylate and acrylic acid in 94:6 ratio, this type being described in Ulrich's U.S. Pat. No. 2,884,126 (Apr. 28, 1959). The original solvent dispersion thereof is coated on a heated drum from which the dried polymer is removed and redispersed in a mixed solvent of heptane and isopropyl alcohol (70:30) to provide a 22% solution of coatable viscosity. This procedure eliminates volatile ingredients of the original polymer solution.

Into this polymer solution chopped polyester fibers are uniformly dispersed in a weight ratio of fiber to solution of 1:100. The polyester fibers utilized are Type 700 of a length of 0.56 cm (commercially available from E. I. Dupont de Nemours & Co., Inc., Granger, N.C.) which have been previously wetted with a small amount of the heptane. This prepared adhesive solution was then coated on a two sided silicone coated Kraft-glassine paper liner which provides a differential of release between both sides (available from Daubert Chemical Co., of Dixon, Illinois). The adhesive is dried bubble free in a circulating warm air oven (100° to 150° F). The resultant adhesive has a caliper thickness of about 3 mils (75 microns) and a coating weight of 0.7 to 0.85 grams per 155 square centimeters.

The optimum lamination temperature for coating the liner to the master foam roll is 108° C. Lamination is accomplished between two steel rools of which the roll in contact with the liner is heated to 108° C. Lamination pressure is dependent upon the foam thickness and the speed with which the laminator is running. In general, thicker foams and faster line speeds require greater pressure in order to obtain satisfactory lamination of the adhesive to the foam. Lamination is usually done at ten to twenty feet per minute (3 to 6 meters per minute) at a roll pressure of approximately 3.5 Kg/cm$^2$.

The master roll of adhesive coated foam which is on a release liner is then control depth cut, depth being determined by the conformability to be obtained, on a burst slitter. The slitter knives are driven at a ratio of 3:1 to 5:1 times faster than the foam web speed. The knives are usually set 0.47 cm to 0.63 cm above the slitter score roll or at a different distance in order to obtain the requisite conformability.

The adhesive liner side of the foam is positioned on the slitter score roll opposite the knives which control depth cut the foam. The thereby cut foam having parallel cuts the length of the foam is wound back into a master roll. The master roll of control depth cut foam is then die slit through the full thickness of the material in a roller type press. This press slits the foam in a discontinuous pattern perpendicularly to the previously discussed cuts and also die cuts the foam into the desired final dimensions.

In use, the release liner is removed and the material is adhered in place over the area to be protected. Such placement should result in the cuts running parallel with the limb and the perforations being extensible in the direction of joint flexure.

The following example illustrates the practice of the invention but should not be construed to be limiting.

EXAMPLE

An open cell polyurethane foam sheet of the type discribed above having a thickness of about 2.54 cm and a density of 0.0160 gm/cm$^3$ was laminated with adhesive as described above. The foam was then cut to a depth of 1.95 cm, thus a thickness of 0.60 cm of foam remained after the cutting. The cuts were made in parallel rows 1.59 cm apart. The foam was then slit so that it had rows of slits 0.635 cm apart with the slits in each row being 2.22 cm long and 1.59 cm apart. The slits in each row were offset from the slits in the next adjacent row. The rows of slits were perpendicular to the cuts in the foam and the cuts passed through the approximate center of the slits of the foam. Following the procedure above described, the stiffness of the foam was tested in respect to the cuts and found to be 0.82 gm/cm. The foam was found to be conformable to body members.

What is claimed is:

1. A foam material which is conformable to body members and comprises a relatively thick foam sheet having a top surface and a skin contacting surface, said foam sheet containing therethrough a substantial number of perforations, said foam between a substantial number of the perforations being cut from the top surface through a portion of the thickness of the foam, said cuts resulting in foam segments which are hingedly connected to adjacent segments adjacent the skin contacting surface of said foam sheet, said foam containing a sufficient number of perforations to permit the foam to be relatively extensible in the longitudinal dimension and said foam having a stiffness in its latitudinal dimension of from about 0.4 gm/cm to about 2.0 gm/cm.

2. The foam material of claim 1 wherein said foam is open cell polyurethane.

3. The foam material of claim 1 wherein said perforations are slits and wherein said cuts intersect said slits and form a network of individual segments.

4. The foam material of claim 1 wherein the skin contacting surface of said form sheet is coated on at least a portion thereof with an adhesive.

5. A foam material which is conformable to body members and comprises a relatively thick foam sheet having a top surface and a skin contacting surface, said foam sheet containing therethrough a substantial number of perforations, said foam between a substantial number of the perforations being cut from the top surface through a portion of the thickness of the foam, said cuts resulting in foam segments which are hingedly connected to adjacent segments adjacent the skin contacting surface of said foam sheet, said foam material having a stiffness of from about 0.4 gm/cm to about 2.0 gm/cm in both its longitudinal and latitudinal dimensions.

6. The foam material of claim 5 wherein the skin contacting surface of said foam sheet is coated on at least a portion thereof with an adhesive.

* * * * *

UNITED STATES PATENT AND TRADEMARK OFFICE

CERTIFICATE OF CORRECTION

PATENT NO. : 4,121,005

DATED : October 17, 1978

INVENTOR(S) : Charles W. Roberts

It is certified that error appears in the above-identified patent and that said Letters Patent are hereby corrected as shown below:

Column 3, line 49, "conformatility" should be --conformability--; and

Claim 4, column 6, line 24, "form sheet" should be --foam sheet--.

Signed and Sealed this

***Sixteenth* Day of *January 1979***

[SEAL]

*Attest:*

RUTH C. MASON
*Attesting Officer*

DONALD W. BANNER
*Commissioner of Patents and Trademarks*